United States Patent [19]
Kettner

[11] Patent Number: 5,907,954
[45] Date of Patent: Jun. 1, 1999

[54] METHOD AND SYSTEM FOR REGULATING MIXED AIR IN AN AIR CONDITIONING SYSTEM OF A MOTOR VEHICLE

[75] Inventor: Detlef Kettner, Bruühl, Germany

[73] Assignee: Max Kammer GmbH, Oberursel, Germany

[21] Appl. No.: 08/807,065

[22] Filed: Feb. 27, 1997

[30] Foreign Application Priority Data

Mar. 1, 1996 [DE] Germany .................... 196 08 015

[51] Int. Cl.$^6$ .................... F25D 17/06; F25B 49/00
[52] U.S. Cl. .................... 62/90; 165/251
[58] Field of Search .................... 165/251; 62/90, 62/176.6

[56] References Cited

U.S. PATENT DOCUMENTS

| 3,979,922 | 9/1976 | Shavit | 165/251 |
| 4,570,448 | 2/1986 | Smith | 165/251 |

FOREIGN PATENT DOCUMENTS

| 0142139 | 8/1983 | Japan | 165/251 |

*Primary Examiner*—William Wayner
*Attorney, Agent, or Firm*—Martin A. Farber

[57] ABSTRACT

A method of and system for regulating mixed air in an air-conditioning system of a motor vehicle provides for feeding fresh air and/or recirculated air to the air conditioning system. For optimizing the energy consumption for automobile air-conditioning systems, the specific enthalpy of the fresh air and the specific enthalpy of the recirculated air and/or of a mixed air are determined and, after a comparison of the specific enthalpies, a feed of fresh air and recirculated air is so adjusted that the mixed air has the specific enthalpy which is in each case most favorable from an energy standpoint.

9 Claims, 2 Drawing Sheets

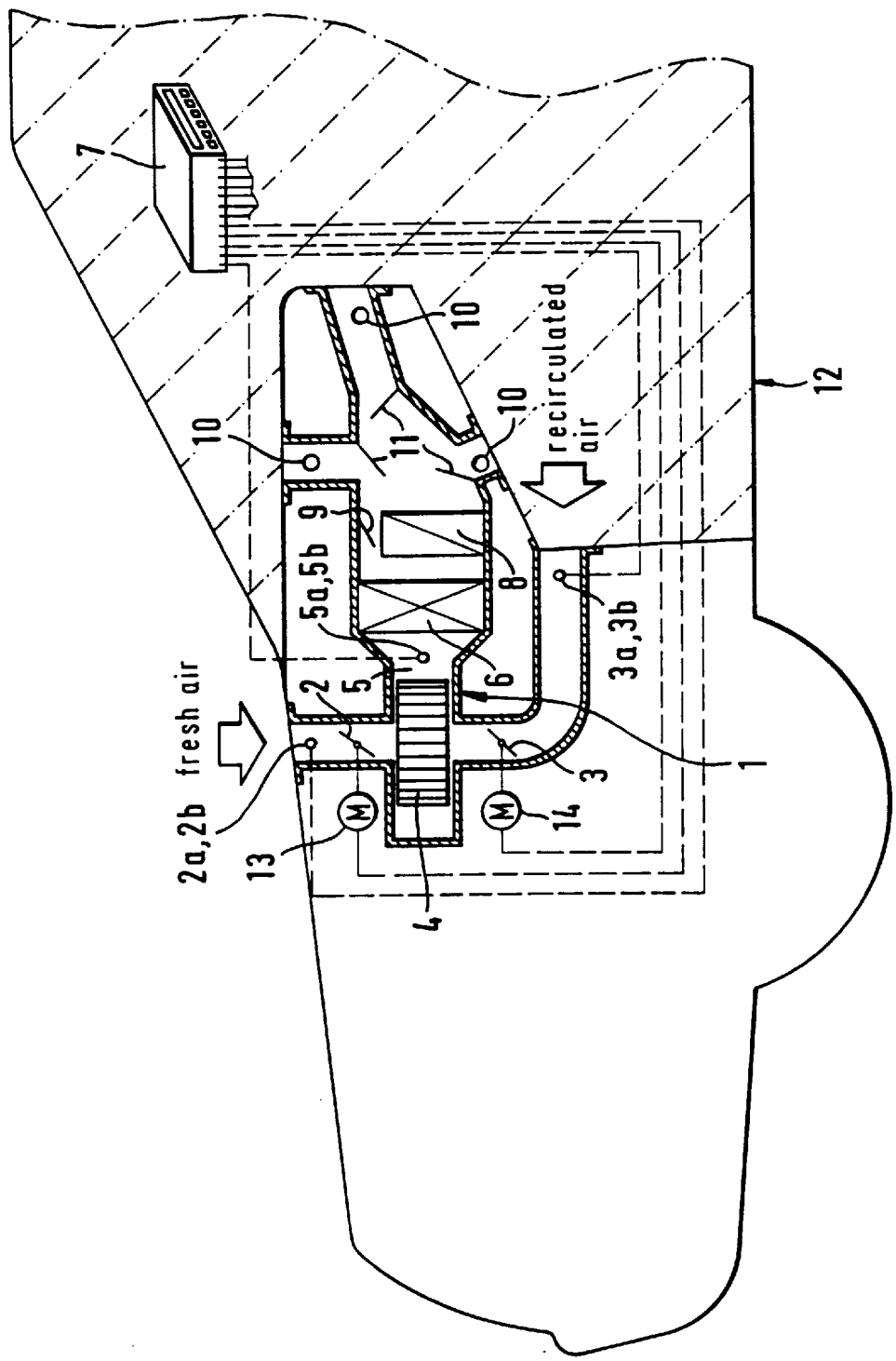

METHOD AND SYSTEM FOR REGULATING MIXED AIR IN AN AIR CONDITIONING SYSTEM OF A MOTOR VEHICLE

FIELD AND BACKGROUND OF THE INVENTION

The present invention relates to a method of regulating mixed air in an air conditioning system of a motor vehicle in which fresh air and/or recirculated air is fed to the air-conditioning system, and to a system for the carrying out of the method.

In the automobile air-conditioning systems which are customary today, either fresh air or recirculated air is conducted by a fan through the air-conditioning system for the treatment of the air.

With increasing demands for comfort, the desire arose in connection with car air-conditioning systems to control of the temperature within the car automatically in such a manner that the passengers feel as comfortable as possible in the car. Ordinarily, the temperature within the car is measured by a temperature sensor and the temperature desired is set by a control device. Energy-rich fresh air is generally conveyed in continuous operation through the heat exchanger of the air-conditioning system. The selecting of fresh air or of recirculated air for the purpose of the continuous optimizing of energy is not effected here.

SUMMARY OF THE INVENTION

It is an object of the invention to indicate a method for optimizing the consumption of energy by an automobile air-conditioning system.

According to the invention, the specific enthalpy of the fresh air as well as the specific enthalpy of the recirculated air and/or of a mixed air are determined and, after a comparison of the specific enthalpies which have been determined in this manner, the feed of fresh air and recirculated air is so adjusted that the mixed air has the specific enthalpy which is most favorable in each case from an energy standpoint.

The advantage of the invention is that the heat exchanger of the air-conditioning system is fed an automatically controlled mixture of air which has the most favorable condition of energy. Particularly in regions of moderate climate, switching can thus be effected completely automatically between energy fresh air and recirculated air, whichever is more favorable from an energy standpoint.

Comparison of the specific enthalpy of the mixed air fed directly to the heat exchanger with the specific enthalpy of the fresh air permits a particularly exact adjustment of the flow of fresh air and recirculated air.

In one embodiment of the invention the feeding of fresh air and of recirculated air and/or mixed air is so adjusted after the comparison of the specific enthalpies that the smallest difference in specific enthalpy is adjusted in each case on a cooling heat exchanger.

The specific enthalpy is advantageously determined in the manner that the temperature and relative humidity of the air are measured. As an alternative, the specific enthalpy can also be determined via the wet-bulb temperature.

Another feature of the invention is that a specific desired proportion of fresh air is continuously fed to the air conditioner.

In order to make certain that the persons present in the vehicle have a sufficient supply of fresh air, a proportion of fresh air which is desired as a function of the number of persons present in the vehicle is selected.

The method of the invention is preferably carried out by a system in which a fresh air flap (2) and a circulating air flap (3) are arranged in an air conditioner (1) of the vehicle, and the air introduced is moved by a fan (4) to a cooling heat exchanger (6). A temperature sensor (2a, 3a, 5a) and a humidity sensor (2b, 3b, 5b) are arranged both in the stream of fresh air and in the stream of recirculated air and/or in the stream of mixed air, and give off corresponding signals for the determination of the specific enthalpies to an air conditioner control device (7) which controls the fresh air flap (2) and the circulating-air flap (3) as a function of the specific enthalpies.

It is thus possible to carry out the method of the invention in a simple manner and with known means present in every air conditioning system. In particular, the use of a microcomputer as control device permits a simple determination of the specific enthalpies by means of suitable software.

Further according to the invention, the temperature sensor (5a) and the humidity sensor (5b) of the stream (4) of mixed-air are arranged behind the fan (4).

The invention also provides that the air conditioner control device (7) is connected with sensors for the detection of persons in the vehicle.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 2 shows the arrangement of the devices of FIG. 1 in the vehicle.

DETAILED DESCRIPTION OF THE PREFERRED EMBODIMENTS

Figure 1:
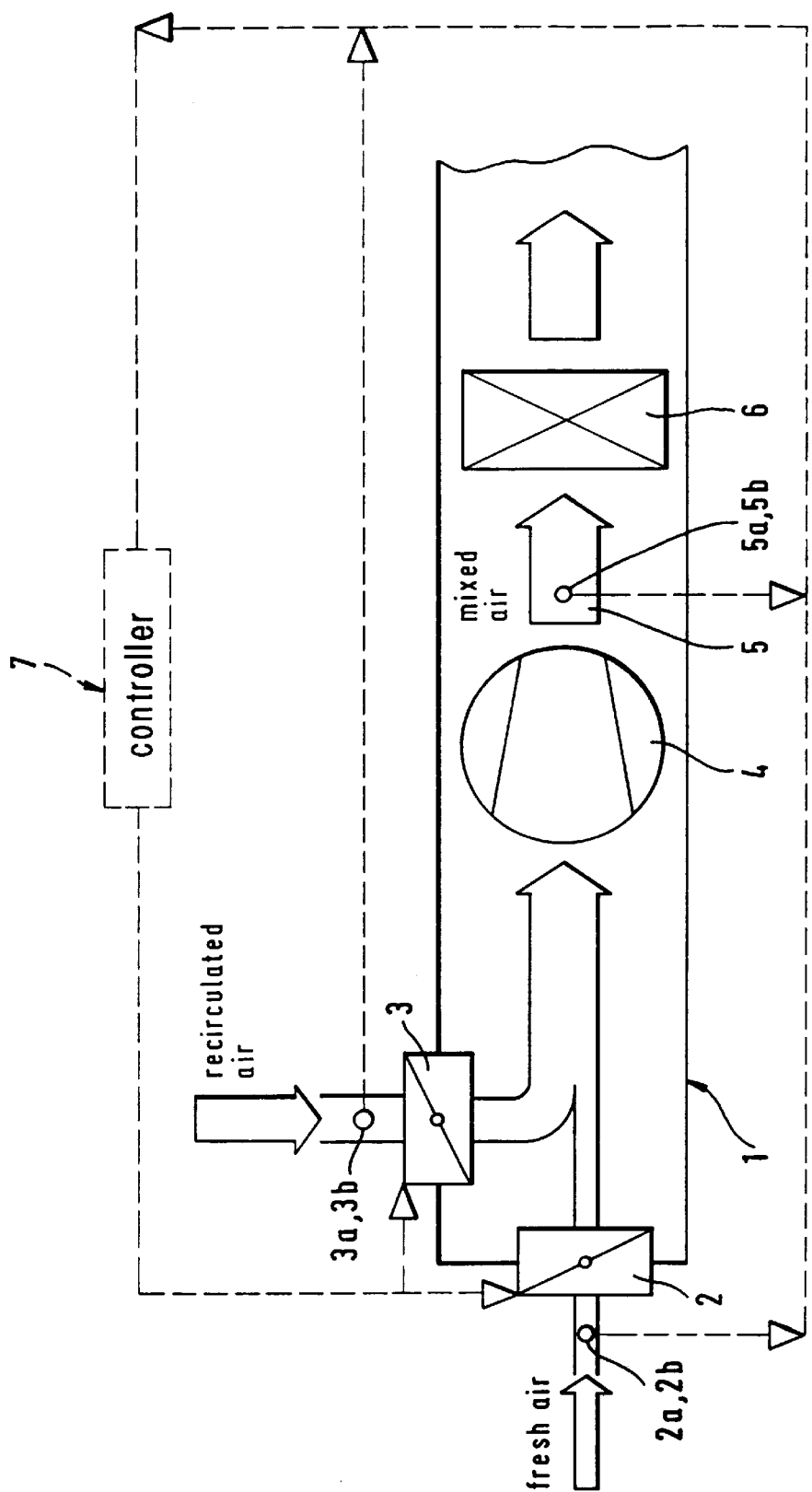
FIG. 1 shows the devices of an air-conditioner control system of a motor vehicle which are necessary for the method of the invention.

Identical features have been provided with the same reference numerals

In accordance with FIG. 1, both a fresh air flap 2 for the feeding of fresh air and a recirculated air flap 3 for adjusting the feed of recirculated air from the vehicle are arranged in an air conditioner 1. The recirculated air and the fresh air are conveyed by a fan 4 and at the same time eddied thereby. Mixed air 5 is produced, which is fed to a cooling heat exchanger 6 and delivered from the latter to the interior of the vehicle upon air-conditioning operation.

The cooling output required from a cooling heat exchanger 6 of an air conditioner 1 is determined by the product of the difference in specific enthalpy between the entrance and exit of the air to be cooled by the cooling heat exchanger and the mass flow of air through the heat exchanger.

In order now to set the optimal output of the cooling heat exchanger 6 of the air conditioner 1, the specific enthalpy of both the fresh air and the recirculated air is determined.

As an alternative to this, the specific enthalpies of the fresh air and the mixed air 5 in front of the cooling heat exchanger 6 can be compared with each other.

For this purpose, a temperature sensor 2a and a sensor for the relative humidity 2b are arranged in the stream of fresh air in the vicinity of the fresh air flap 2.

A temperature sensor 3a and another sensor for the relative humidity 3b are also arranged in the vicinity of the recirculated air flap 3. The signals of the temperature sensors 2a, 3a and of the humidity sensors 2b, 3b are fed to the air conditioner control device 7 for calculating the specific enthalpies for the fresh air and the recirculated air.

The specific enthalpies of the fresh air and recirculated air which are thus determined are compared with each other. Based on this comparison, the fresh air flap 2 and the recirculated air flap 3 are so opened that the smallest difference between the specific enthalpy of the fresh air and the specific enthalpy of the mixer air (or recirculated air) is established across the cooling heat exchanger 6. The different amounts of opening of the individual values can in this way be firmly set.

As already mentioned, a third temperature sensor 5a and a third humidity sensor 5b are arranged in the stream of mixed air 5 behind the fan 4. The results of the measurements of these sensors are also fed to the air conditioner control device 7 which calculates the specific enthalpy of the mixed air 5. Depending on the degree of accuracy of the control, the recirculated air and fresh air flaps are determined as a function of the enthalpy values of the fresh air and the recirculated air or of the fresh air and the mixed air.

For the effecting of a fine adjustment of the control, it is also possible for the air conditioner control device 7 to process the signals of the sensors in the streams of recirculated air, fresh air and mixed air simultaneously.

In order to assure a minimum amount of fresh air for the passengers, a desired percentage of fresh air of 20% to 80% is provided, depending on the number of passengers in the vehicle.

In order to determine how many passengers are in the vehicle, electrical contacts in the passenger seats and/or on the safety-belt locking mechanisms are interrogated by the air conditioner control device 7 and the corresponding desired proportion of fresh air thus set.

In FIG. 2, the air conditioner 1 is shown in a concrete arrangement within the motor vehicle 12.

Fresh air is drawn from the outside of the vehicle into the vehicle 12 via the fresh air flap 2. The position of the fresh air flap 2 is controlled by a servomotor 13 as a function of electric signals which are triggered by the air conditioner control device 7 in accordance with the method described.

The recirculated air from inside the vehicle is drawn in by the air conditioner 1 via the recirculated air flap 3. The position of the recirculated air flap 3 is also controlled by a servomotor 14 as a function of electric signals from the air conditioner control device 7. Recirculated air and fresh air are conveyed into the air conditioner by the fan 4, mixed air 5 being thus present behind the fan 4. This mixed air 5 is fed to the cooling heat exchanger 6.

In air conditioning operation, the mixed air is introduced through discharge openings 10 into the passenger space. These discharge openings 10 are arranged in ducts which extend in the direction of the windshield, in the direction of the driver and the front-seat passenger and in the direction of the feet of the driver and the front-seat passenger. By means of the air-distributing flaps 11 arranged in the individual ducts, the entrance of air can be regulated by the driver and the front-seat passenger.

Adjoining the cooling heat exchanger 6 there is a heating heat exchanger 8. The amount of air given off by the cooling heat exchanger is fed by means of a temperature flap 9 past the heating heat exchanger and thereby heated. Upon heating operation, the correspondingly heated mixed air then flows into the passenger space.

I claim:

1. A method of regulating mixed air in an air conditioning system of a motor vehicle in which fresh air and/or recirculated air is fed to the air-conditioning system, the method comprising steps of:

determining a first specific enthalpy of the fresh air and a second specific enthalpy of the recirculated air and/or of a mixed air;

comparing said first and said second specific enthalpies;

adjusting a feed of fresh air and recirculated air so that the mixed air has a specific enthalpy which minimizes a difference between the specific enthalpy of the fresh air and the specific enthalpy of the mixed air.

2. A method according to claim 1, wherein, in said adjusting step, the feed of fresh air and of recirculated air is so adjusted after said comparing step that a minimum difference in specific enthalpy is is attained across a cooling heat exchanger of the air conditioning system.

3. A method according to claim 1, wherein, in said determining step, there is a measuring of the temperature and relative humidity of the fresh air and the recirculated air.

4. A method according to claim 1, wherein, in said determining step, the specific enthalpy is determined via a wet-bulb temperature.

5. A method according to claim 1, further comprising a step of feeding a specific desired proportion of fresh air continuously to the air conditioning system.

6. A method according to claim 5, wherein, in said feeding step, there is a selecting of a proportion of fresh air which is desired as a function of a number of persons present in the vehicle.

7. A system for regulating mixed air in an air conditioning system of a motor vehicle in which fresh air and/or recirculated air is fed to the air-conditioning system, the system providing for determining a first specific enthalpy of the fresh air and a second specific enthalpy of the recirculated air and/or of a mixed air;

comparing said first and said second specific enthalpies;

adjusting a feed of fresh air and recirculated air so that the mixed air has a specific enthalpy which is most favorable from an energy standpoint;

wherein the regulating system comprises:

an air conditioner of the vehicle having a recirculating air flap, a fan, a fresh air flap, a cooling heat exchanger, a plurality of temperature sensors, a plurality of humidity sensors, and an air conditioner control device;

wherein the fan moves air, introduced via the fresh air flap and the recirculating air flap, to the cooling heat exchanger;

the temperature and the humidity sensor are arranged both in a stream of fresh air and in a stream of recirculated air and/or in a stream of mixed air, and give off corresponding signals for a determination of the specific enthalpies to the air conditioner control device; and the control device controls the fresh air flap and the recirculating-air flap as a function of the specific enthalpies.

8. A regulating system according to claim 7, wherein one of the temperature sensors and one of the humidity sensors located in the stream of mixed-air are arranged behind the fan.

9. A regulating system according to claim 7, further comprising detectors, connected to the air conditioner control device, for the detection of persons in the vehicle.

* * * * *

UNITED STATES PATENT AND TRADEMARK OFFICE
CERTIFICATE OF CORRECTION

PATENT NO.   : 5,907,954
DATED        : June 1, 1999
INVENTOR(S)  : Detlef Kettner It is certified that error appears in the above-identified patent and that said Letters Patent is hereby corrected as shown below:

<u>Title page,</u>
Item [73], Assignee, "Max Kammer GmbH, Oberursel," change to read
-- Max Kammerer GmbH, Oberursel, --

Signed and Sealed this

Twelfth Day of August, 2003

JAMES E. ROGAN
*Director of the United States Patent and Trademark Office*